United States Patent Office 2,992,258
Patented July 11, 1961

2,992,258
STABLE LEAD ALKYL COMPOSITIONS AND A METHOD FOR PREPARING THE SAME
Hymin Shapiro, Baton Rouge, La., and Herbert R. Neal, Farmington, Mich., assignors to Ethyl Corporation, New York, N.Y., a corporation of Delaware
No Drawing. Filed Dec. 8, 1959, Ser. No. 858,043
5 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C. the decomposition rate increases logarithmically so that a point is soon reached where external heat is no longer required and decomposition becomes self-propagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz. separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation, and storage.

The above and other objects of this invention are accomplished by incorporating with alkyllead compounds a relatively small quantity of a material which has the property of inhibiting alkyllead thermal decomposition. The foregoing objects are also accomplished by conducting one or more of the foregoing operations in the presence of such a material. The materials which have been found to possess the property are referred to hereinafter as "thermal stabilizers."

The thermal stabilizers of this invention are aromatic monocarboxylic acids in which the aryl portion contains from 6 to about 18 carbon atoms. These thermal stabilizers when used in amount varying from about 0.25 to about 10 percent by weight of the lead alkyl product are effective in substantially retarding or preventing thermal decomposition of the alkyllead compounds at temperatures above 100° C. for extended periods of time.

This invention is predicated on the discovery that the introduction of one carboxylic acid group into the ring of an aromatic hydrocarbon containing from 6 to about 18 carbon atoms causes a very substantial improvement in the thermal stabilizing ability of the resulting compound as compared with the original hydrocarbon. By way of example, benzene has no ability whatsoever in practical concentrations to stabilize lead alkyls against thermal decomposition at temperatures above 100° C. However, benzoic acid (benzene into which has been introduced one carboxylic group) exerts a very profound effectiveness in this regard. This same marked improvement in effectiveness carries over into all aromatic hydrocarbons as above defined. For example, the effectiveness of toluene, xylene, mesitylene, naphthalene, chrysene and like aromatic compounds is markedly improved when these compounds are converted into the corresponding monocarboxylic acids.

An important feature of this invention is that the present thermal stabilizers are relatively inexpensive and easily made. In fact, a number of them are available as articles of commerce.

Typical thermal stabilizers of this invention are benzoic acid; o-toluic acid; m-toluic acid; p-toluic acid; 2,3-xylic acid; 2,4-xylic acid; 2,5-xylic acid; 2,6-xylic acid; 3,4-xylic acid; 3,5-xylic acid; p-tert-butyl benzoic acid; 3,5-dihexyl benzoic acid; 1-naphthoic acid; 2-naphthoic acid; 5-isopropyl-1-naphthoic acid; 1-anthroic acid; 2-anthroic acid; 9-anthroic acid and the like.

The chief thermal decomposition products of alkyllead compounds are lead metal and hydrocarbon gas. Hence, a very good index of alkyllead thermal decomposition is liberation of this gas.

To illustrate the effectiveness of this invention, direct comparisons were made between the decomposition characteristics of unstabilized and stabilized tetraethyllead. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 160° C., the sample-containing tube was quickly immersed in the bath and clamped with the levelling bottle adjusted to hold the gas buret in place at a zero reading. Then measured was the time during which the sample was held at 160° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred within 1 minute as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

However, when to the same amount of tetraethyllead there was previously added 2 percent by weight of benzoic acid no pronounced deterioration occurred at 160° C. for over 40 minutes. The same order of effectiveness subsists when repeating this experiment using in one instance 2 percent by weight of p-toluic acid, and in another instance 2 percent by weight of 3,5-xylic acid. When these experiments are repeated using the same concentration of 1-naphthoic acid, 2-naphthoic acid, 1-anthroic acid, 2-anthroic acid and 9-anthroic acid even greater effectiveness against thermal deterioration at 160° C. exists. In fact with these compounds no deterioration occurs for over 100 minutes.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention.

What is claimed is:
1. A method of inhibiting the decomposition of an alkyllead compound at temperatures of from about 100° C. to about 160° C. which comprises incorporating with said compound a small amount of an aromatic monocarboxylic acid characterized by consisting of an aromatic hydrocarbon containing from 6 to about 18 carbon atoms having one carboxylic acid group attached to an aromatic ring thereof, sufficient to inhibit such decomposition.

2. In the process of producing an alkyllead compound by reacting a sodium lead alloy with alkyl chloride and separating the thus produced alkyllead compound from the reaction mass by steam distillation, the step which comprises conducting said steam distillation in the presence of a small amount of an aromatic monocarboxylic acid as described in claim 1 sufficient to inhibit thermal decomposition of an alkyllead compound.

3. An alkyllead compound containing, in amount sufficient to inhibit thermal deterioration thereof at temperatures from about 100° C. to about 160° C., an aromatic monocarboxylic acid as described in claim 1 sufficient to inhibit thermal decomposition of the alkyllead compound.

4. The composition of claim 3 wherein said acid is selected from the group consisting of 1-naphthoic acid, 2-naphthoic acid, 1-anthroic acid, 2-anthroic acid, and 9-anthroic acid.

5. Tetraethyllead containing a small amount of benzoic acid sufficient to inhibit thermal deterioration of the tetraethyllead at temperatures of from about 100° C. to about 160° C.

References Cited in the file of this patent
UNITED STATES PATENTS

| | | |
|---|---|---|
| 2,660,593 | Calingaert | Nov. 24, 1953 |
| 2,727,053 | Krohn | Dec. 13, 1955 |